(12) United States Patent
Segovia Quintero

(10) Patent No.: US 10,973,210 B2
(45) Date of Patent: Apr. 13, 2021

(54) RECIRCULATING AQUACULTURE SYSTEMS FOR THE CONDITIONING AND MATURATION OF MOLLUSKS

(71) Applicant: CENTRO DE INVESTIGACION CIENTÍFICA Y EDUCACIÓN SUPERIOR DE ENSENADA, Ensenada (MX)

(72) Inventor: Manuel Alberto Segovia Quintero, Ensenada (MX)

(73) Assignee: Centro de Investigacion Cientifica y Educación Superior de Ensenada, Baja California (MX)

(*) Notice: Subject to any disclaimer, the term of this patent is extended or adjusted under 35 U.S.C. 154(b) by 624 days.

(21) Appl. No.: 15/846,601

(22) Filed: Dec. 19, 2017

(65) Prior Publication Data

US 2018/0177162 A1    Jun. 28, 2018

Related U.S. Application Data

(60) Provisional application No. 62/438,486, filed on Dec. 23, 2016.

(51) Int. Cl.
*A01K 63/04* (2006.01)
*A01K 61/54* (2017.01)

(52) U.S. Cl.
CPC .............. *A01K 61/54* (2017.01); *A01K 63/04* (2013.01); *Y02A 40/81* (2018.01)

(58) Field of Classification Search
CPC ....... A01K 61/54; A01K 63/04; A01K 63/042
See application file for complete search history.

(56) References Cited

U.S. PATENT DOCUMENTS

| | | | | | |
|---|---|---|---|---|---|
| 3,957,017 | A | * | 5/1976 | Carmignani | A01K 63/04 119/227 |
| 3,973,519 | A | * | 8/1976 | McCarty | A01K 63/04 119/227 |
| 4,297,222 | A | * | 10/1981 | Takeguchi | A01K 63/04 210/167.22 |
| 4,495,891 | A | * | 1/1985 | Dugan | A01K 73/12 119/211 |
| 4,690,756 | A | * | 9/1987 | Van Ry | A01K 63/042 210/221.2 |
| 5,014,647 | A | * | 5/1991 | Woltman | A01K 63/00 119/224 |
| 5,232,582 | A | * | 8/1993 | Takahashi | A01K 63/04 210/121 |

(Continued)

FOREIGN PATENT DOCUMENTS

| | | | | |
|---|---|---|---|---|
| GB | 2333522 | A * | 7/1999 | .............. C02F 3/34 |
| WO | WO-9829177 | A1 * | 7/1998 | .............. C02F 3/085 |

*Primary Examiner* — Magdalena Topolski
(74) *Attorney, Agent, or Firm* — Defillo & Associates; Evelyn A Defillo

(57) ABSTRACT

A recirculating aquaculture system for the conditioning and maturation of bivalve molluscs in a controlled environment; subsequently, once reached their optimal development, the mature molluscs will be used as broodstock in another specific system. Through the system of the present invention the complete conditioning and maturation process of bivalve molluscs takes around 8 to 12 weeks, time after which the molluscs are fit to be transferred to the reproduction system.

9 Claims, 4 Drawing Sheets

(56) References Cited

U.S. PATENT DOCUMENTS

| | | | | |
|---|---|---|---|---|
| 5,282,962 | A * | 2/1994 | Chen | A01K 63/045 |
| | | | | 119/259 |
| 5,562,821 | A * | 10/1996 | Gutierrez-Collazo | |
| | | | | B03D 1/1406 |
| | | | | 210/167.26 |
| 5,665,227 | A * | 9/1997 | Watt | A01K 63/04 |
| | | | | 210/167.26 |
| 5,736,034 | A * | 4/1998 | Phillips | A01K 63/04 |
| | | | | 210/167.26 |
| 5,961,831 | A * | 10/1999 | Lee | A01K 63/042 |
| | | | | 210/614 |
| 6,156,209 | A * | 12/2000 | Kim | A01K 63/04 |
| | | | | 119/263 |
| 6,491,826 | B1 * | 12/2002 | Helwig | A01K 63/04 |
| | | | | 210/167.26 |
| 6,641,718 | B2 * | 11/2003 | Lari | A01K 63/045 |
| | | | | 119/259 |
| 6,808,625 | B1 * | 10/2004 | Wu | A01K 63/04 |
| | | | | 119/263 |
| 7,029,577 | B2 * | 4/2006 | Cummins | A01K 63/042 |
| | | | | 210/167.31 |
| 7,682,503 | B1 * | 3/2010 | Norris | A01K 63/045 |
| | | | | 210/167.21 |
| 9,451,759 | B2 * | 9/2016 | Kuo | A01K 63/04 |
| 2004/0089611 | A1 * | 5/2004 | Curlee | B01D 19/02 |
| | | | | 210/703 |
| 2004/0182767 | A1 * | 9/2004 | Patron | A01K 63/045 |
| | | | | 210/167.22 |
| 2005/0183998 | A1 * | 8/2005 | Joneid | A01K 63/045 |
| | | | | 210/167.21 |
| 2006/0225661 | A1 * | 10/2006 | Riemma | A01K 63/04 |
| | | | | 119/245 |
| 2007/0069403 | A1 * | 3/2007 | Schletz | B03D 1/1412 |
| | | | | 261/76 |
| 2007/0193956 | A1 * | 8/2007 | Nelson | B01D 21/0012 |
| | | | | 210/703 |
| 2008/0006569 | A1 * | 1/2008 | Liu | A01K 63/045 |
| | | | | 210/167.26 |
| 2008/0314811 | A1 * | 12/2008 | Smith | B60L 3/003 |
| | | | | 210/167.21 |
| 2009/0200242 | A1 * | 8/2009 | Newman | C02F 1/006 |
| | | | | 210/703 |
| 2010/0096307 | A1 * | 4/2010 | Weidl | A01K 63/04 |
| | | | | 210/136 |
| 2012/0312243 | A1 * | 12/2012 | Rusch | A01K 61/20 |
| | | | | 119/204 |
| 2020/0100477 | A1 * | 4/2020 | Sekiyama | A61D 7/00 |

* cited by examiner

RECIRCULATING AQUACULTURE SYSTEMS FOR THE CONDITIONING AND MATURATION OF MOLLUSKS

CROSS-REFERENCE TO RELATED APPLICATIONS

This application claims the benefit of priority to U.S. Provisional Application No. 62/438,486 filed Dec. 23, 2016, the contents of which is incorporated herein by reference.

FIELD OF THE INVENTION

This invention relates to a recirculating aquaculture system for the conditioning and maturation of bivalve molluscs in a controlled environment; subsequently, once reached their optimal development, the mature molluscs will be used as broodstock in another specific system.

BACKGROUND OF THE INVENTION

There are numerous patents and patent applications that present the culture of bivalve molluscs for their growth until desired commercial sizes for their consumption. Among these documents are:

The prior art shows several patents and patent application for the culture of molluscs in marine waters.

The prior art also shows disclosures that are the culture of molluscs is carried out in some type of aquaculture.

In addition, the prior art shows the culture of bivalve molluscs; in particular, but not exclusively, to the culture of oyster seed. First, larvae of oysters, another type of bivalve molluscs, are grown (200-250 microns) and during the settling process (larva to seed) they settle on small particles (50-500 microns). The larva or seed settled on a microparticle is called SPAT. The SPAT is kept in tanks where an upwelling water flow (bottom to surface) keeps it suspended in the water (this patent describes a system to keep the SPAT suspended in the water). This is called fluidized bed, based on the fluidization of the SPAT which allows them to remain suspended in the water column. This is a continuous flow system, not a closed or recirculating system such as the one described in the present invention; meaning, it is an open system and it does not contain a biological filter or methods to control solids in the system. On the contrary, the present invention is a closed system for the conditioning and maturation of adult oysters able to reproduce.

Furthermore, the prior art shows a tank for growing gastropod molluscs (molluscs with an outer shell), whereas our invention is for bivalve molluscs (molluscs with a two-part hinged shell or valve) comprising a tank where water is contained, including grids where larvae can settle or juveniles and broodstock can be kept. This is an open system; it is not a closed or recirculating system. On the contrary, the present invention is a closed system for the conditioning and maturation of adult oysters able to reproduce.

In addition, the prior art discloses a continuous flow system for the culture of Catarina scallop in their larval stage, including containers for the settlement of larvae (SPAT), and culture of early juveniles. Furthermore, said invention includes thermally insulated containers for the transfer of juveniles to an oyster culture farm. This is an open system; it is not a closed or recirculating system. On the contrary, the present invention is a closed system for the conditioning and maturation of adult oysters able to reproduce.

The prior art also shows a fluidized bed, which in this case is used to keep adult bivalve molluscs. The water comes from a tadpole or shrimp pond, travels through the container where the upward flow is (fluidized bed), and once the nutrients are depleted, exits from the top. This is an open system; it is not a closed or recirculating system, and it is used for the culture of adult bivalve molluscs. On the contrary, the present invention is a closed system for the conditioning and maturation of adult oysters able to reproduce.

Finally, the prior art shows a method for cultivating oysters on land, where deep-sea water free of bacteria and microorganisms is used for oyster larvae until they reach commercial size. This is an open system; it is not a closed or recirculating system, and it is used for the fattening of adult bivalve molluscs. On the contrary, the present invention is a closed system for the conditioning and maturation of adult oysters able to reproduce.

SUMMARY OF THE INVENTION

The present invention relates to a recirculating aquaculture system for the conditioning and maturation of bivalve molluscs including: a tank for conditioning and maturation including a top end, an interior cavity, and a bottom end; a bioclarifier tank connected to the conditioning and maturation tank, the bioclarifier tank including a top end, an interior cavity forming a chamber, and a bottom end; a foam fractionator device located inside the bioclarifier tank, the foam fractionator device including inside a reaction chamber; a foam collector located on an upper end of the reaction chamber of the foam fractionator; and a reducer bushing located underside of the bioclarifier tank.

DETAILED DESCRIPTION OF THE INVENTION

Figure 1:
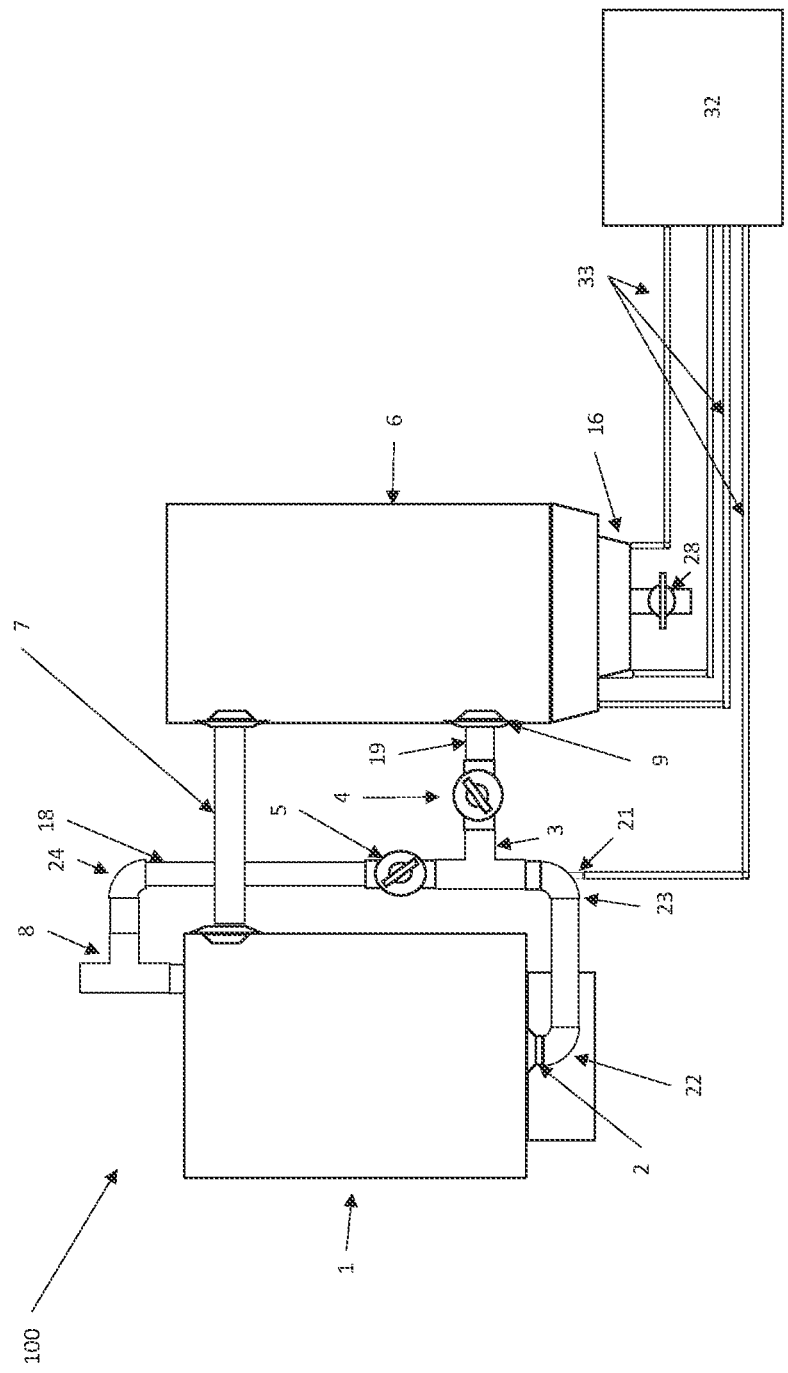
FIG. 1 shows side view of the system for the conditioning and maturation of bivalve organisms broodstock according to an embodiment of the present invention.
Figure 2:
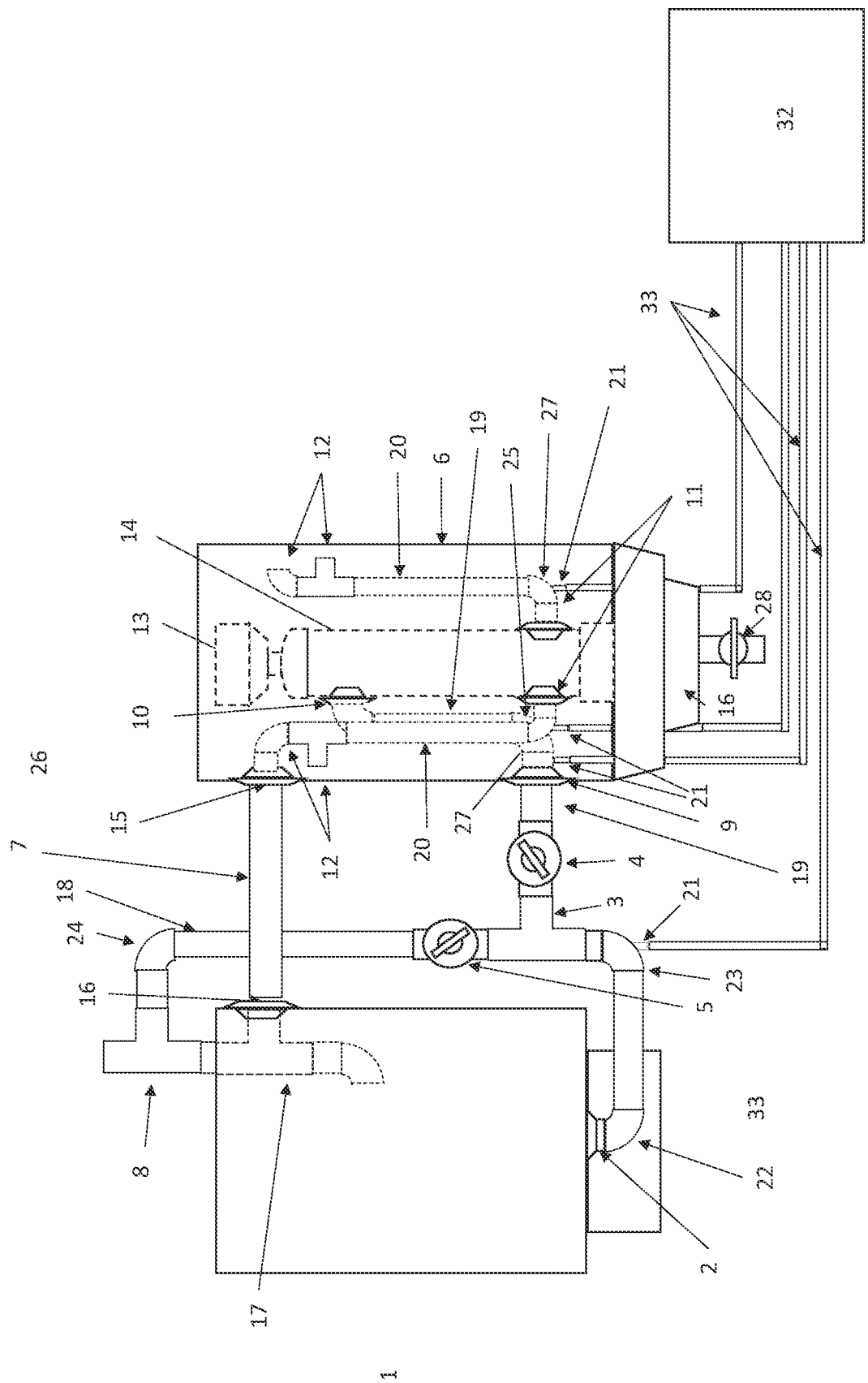
FIG. 2 shows a side view of the system of FIG. 1 showing the interior details in dotted lines.
Figure 3:
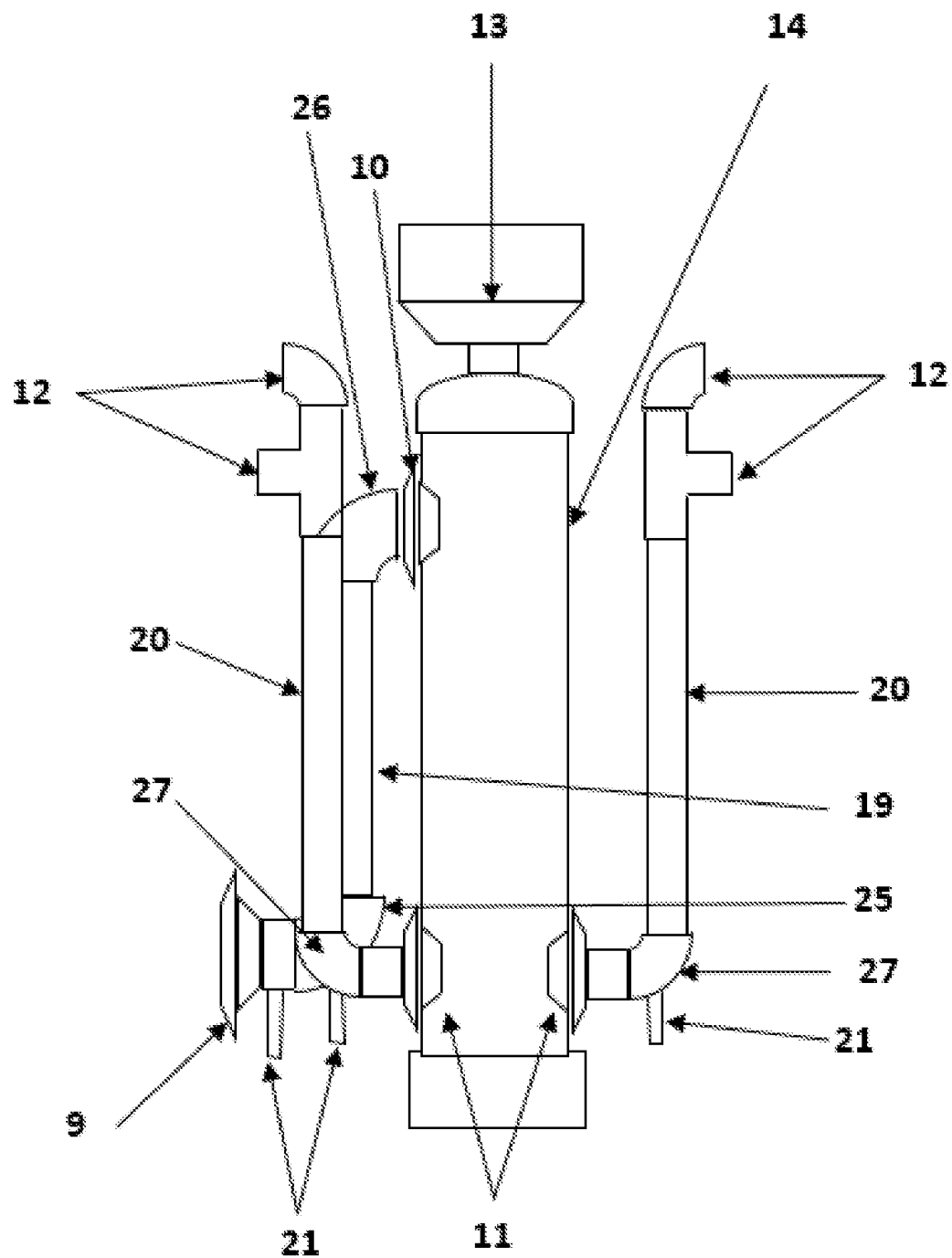
FIG. 3 shows a side view of a foam fractionator according to the present invention.
Figure 4:
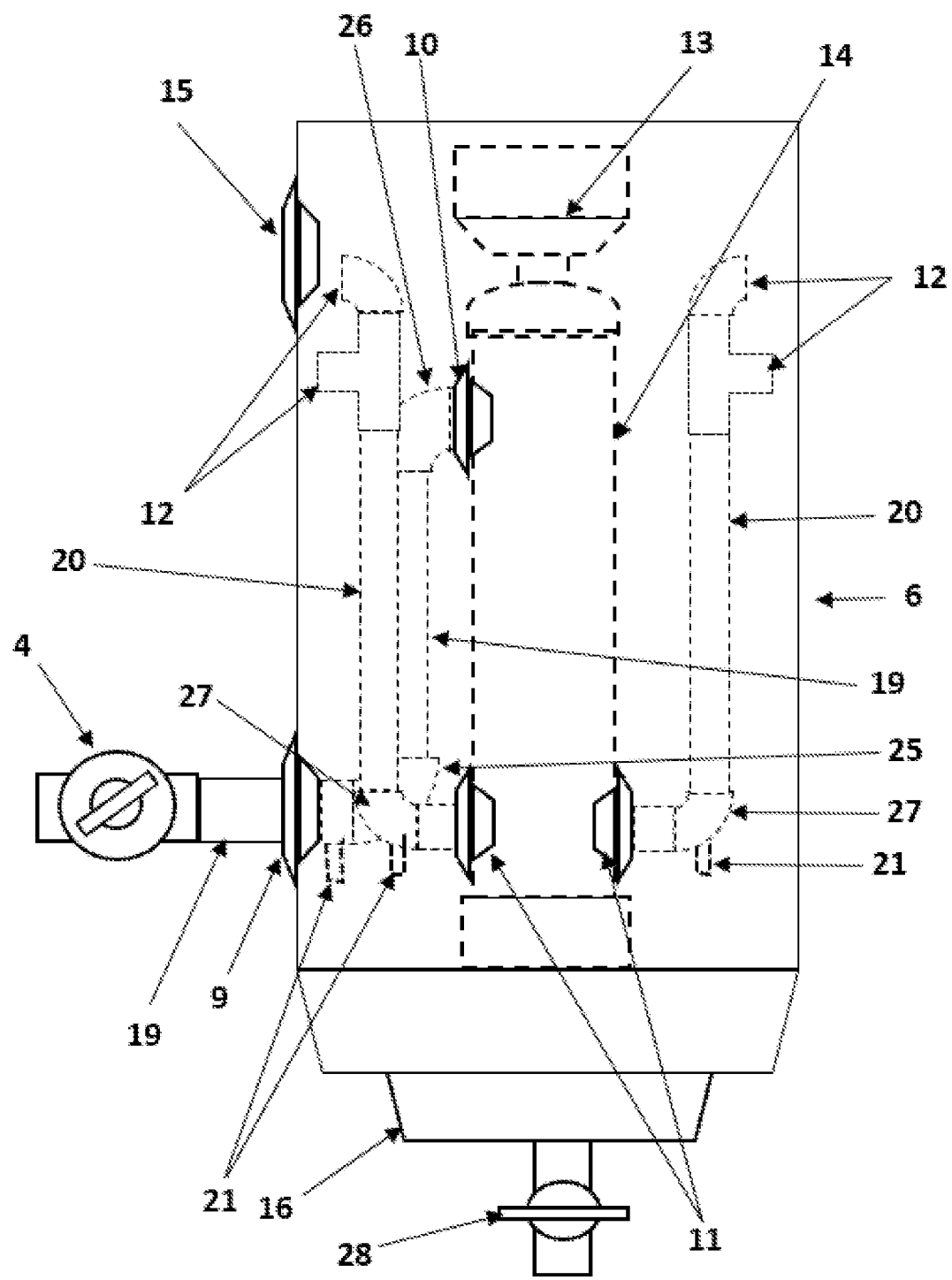
FIG. 4 shows the side view of the fractionator inside the bioclarifier tank including the interior details in dotted lines of the foam fractionator.

The recirculating aquaculture system for the conditioning and maturation of bivalve molluscs of the present invention 100 includes a tank for conditioning/maturation (1) and a bioclarifier tank (6) placed next to the conditioning and maturation tank (1) leaving a gap between them for the pipes and valves connecting them. The tank for conditioning/maturation (1) and the bioclarifier tank (6) may have any geometrical shape, for example, cylindrical, rectangular, square, or spherical.

In tank (1) the mollusks (broodstock) are placed and the conditioning/maturation will take place. In the bioclarifier tank (6) two different processes will take place. The first process will be the removal of the total suspended solids (TDS) by the foam fractionators, and the second process will be the nitrification of all nitrogen compounds produced by the mollusks (broodstock) excretion.

At the center of the underside of the conditioning and maturation tank (1), there is an orifice (not shown) from which a downstream outlet pipe (2) is connected. The other end of the outlet pipe (2) is directly connected at to a return elbow (22). The return elbow (22) may be, for example, a 90° return elbow. The other end of the return elbow (22) is simultaneously connected to a return tube (18). The return tube (18) is in a horizontal position and extends beyond the conditioning and maturation tank (1). The other end of the return tube (18) is connected to a second 90° elbow (23) that in its external lower bend is connected to an air inlet pipe (21) placed vertically facing downwards. The second elbow (23) at its other end, connects to another section of the return tube (18) that extends vertically upwards to connect to a lower "T" (3) where it splits and gives way to two secondary pipes; one is the vertical continuation of the return tube (18), and the other one is a lower communicating tube (19). This one extends horizontally to a bioclarifier tank (6). Each one of these two secondary pipes have a gate valve (4) and (5), placed in its central part regarding their length.

The return tube, valves, elbows, and pipes are made of an anticorrosive material, for example, polyvinyl chloride (PVC) to prevent corrosion by the sea water.

The return tube (18) extends upwards connecting to the lower end of its control valve (5) and the upper end of said valve extends beyond the length of the conditioning and maturation tank (1) where is connected to a third 90° return elbow at one of its ends (24) while it is connected to the last section of the return tube (18) at its other end, that horizontally ends in an upper "T" (8), with one of its ends facing downwards entering through the upper side of the conditioning and maturation tank (1) ending in a "T" (17) at the upper third inside the conditioning and maturation tank (1).

The lower communicating tube (19) is connected to a lower "T" end (3), connecting to an end of its own control valve (4), and this is connected at one end to another section of the lower communicating tube (19) that extends into the bioclarifier tank (6) which in its lower section is connected to an air inlet pipe (21) placed vertically as well. The other end of the lower communicating tube (19) is connected to a first 90° elbow (25) from the lower communicating tube; from there, the lower communicating tube (19) extends vertically upward connecting to an end from the second elbow (26) of the lower communicating tube (19).

The bioclarifier tank (6) contains inside its central part, a cylindrical foam fractionator in which the lower communicating tube (19), after being placed upward and connected to the second 90° elbow from the lower communicating tube (26), is entered through the inlet orifice (10) into the reaction chamber (14) of the foam fractionator in the upper section of its lateral side where it ends. This reaction chamber (14) has two opposite orifices (11) at the base of its lateral side from where two tubes horizontally emerge (20) connecting each one, at one of their ends, to one of the lower elbows (27) of the reaction chamber (14). Each one of these elbows has an air inlet pipe (21) connected downwards from their lower external bend. At the other end of these elbows the lateral tubes are connected upwards (20) to the foam fractionator placed vertically up to the upper section inside the bioclarifier (6) where they end (12).

The function of the foam fractionator (skimmer or foam fractionator) is to separate dissolved solid by the floating method. In the reaction chamber, the water enters at the top end and flows to the bottom end. In this chamber are injected very small air bubbles (micron) at the bottom end of the chamber. To generate a counter-current flow, the water enters in descendant flow direction and comes into contact with the bubbles that travels in an ascendant flow direction. Approximately one-third of the total volume is air in the form of micro bubbles and two-thirds is water.

In the reaction area when the water get in contact with the micro bubbles, they attract the particles and the molecules by means of electrical loads. The particles stick to the bubbles and then form a foam that exits on the expansion area and then are collected on the collector.

The bioclarifier tank (6) has an outlet orifice (15) on the upper section of its lateral side that connects to the upper communicating tube (7) that extends into the conditioning and maturation tank entering through the upper section of its lateral side (16) and is internally connected to the return tube (18) through the inner "T" (17) where the return tube ends (18). Through this inner "T", both tubes end in the upper section inside the conditioning and maturation tank (1).

On the upper end of the reaction chamber (14) of the foam fractionator a cylindrical foam collector is connected (13) opened through its upper side.

The underside of the bioclarifier tank contains a reducer bushing (16) and under it, a drain valve (28).

BEST MODE FOR CARRYING OUT THE INVENTION

The operation of the system of the present invention is carried out in the following manner:

At the bottom of the conditioning and maturation cylindrical tank (1) bivalve molluscs are placed for their conditioning and maturation as broodstock and the system is filled with fresh or salt water according to the type of molluscs set for conditioning and maturation. This water is kept in motion through airlift device 32, exiting the conditioning and maturation tank (1) through the outlet pipe (2) placed at the center of the underside of said tank. Afterwards, this outlet pipe is split in two by a lower "T" (3) thus creating two secondary tubes, the return tube (18) and the communicating tube (19), each one having a control valve (4) and (5) that regulates the water volume traveling through them.

Through the lower communicating tube (19), a portion of the water travels to the bioclarifier tank (6), while the other portion of the water returns directly to the conditioning and maturation tank (1) through the return tube (18) on its upper side. This allows to create two water circulation patterns; the first one makes the water coming out of the outlet pipe circulate (2) and it directs it to the conditioning and maturation tank upper side (1); the second one takes the other portion of the water from the conditioning and maturation tank (1) to the bioclarifier tank (6), feeding it back to the conditioning and maturation tank (1). The water flows in each secondary piping are regulated by the control valves (4) and (5) from each secondary tube.

The creation of two circulation patterns is important. The first circulation pattern is used when the molluscs (broodstock) is feed because the food (microalgae) is kept in suspension in the water, with this circulation pattern we do not allow the microalgae to settle in the bottom where it become unavailable to the mollusk (broodstock). The second circulation pattern is used when we want to circulate the water of the conditioning and maturation tank 1 to the bioclarifier (6) to remove uneaten food, feces, and nitrogen compounds.

On the upper section of the conditioning and maturation tank, before the return tube access, there is an upper "T" (8) with an open upper lateral side. It is through the upward open orifice of this "T" that the food for the bivalve molluscs and the makeup water is added to the system periodically.

The bioclarifier tank (6), previously mentioned, contains in its inner central part a foam fractionator that functions through the airlift device 32; it contains a Kaldnes media or K1 or any other similar media. This media has as its main function to provide a substrate for the nitrifying bacteria to be fixed by means of the secretion of a mucopolysaccharide, and carry out the consumption of nitrogen compounds from the conditioning and maturation tank (1). This K1 media functions in a moving bed. Meaning, by injecting air to the lower section of the system through the air inlet pipes (21), which is carried out by connection 33 (hosepipes) connected to the airlift device 32 (air pump), when going up it produces a turbulence that moves the media where the autotrophic bacteria are fixed carrying out the biological filtration or nitrification.

As mentioned earlier, the water inside the system circulates through the airlift device 32. The connections 33 provide the air coming from the airlift device 32 to the system through the air inlet devices 21. The air inlet devices 21 are vertically connected at the lower sections of the second return elbow (23) to the conditioning and maturation tank outlet, to the inlet of the lower communicating tube (19) to the bioclarifier tank that connects to the first elbow (25) of the lower communicating tube and to both outlet elbows (27) of the reaction chamber (14) from the foam fractionator.

The water coming from the conditioning and maturation tank through the lower communicating tube (19) enters the bioclarifier tank through the inlet orifice (9) and is discharged in the upper section of the reaction chamber (14) of the foam fractionator (10). This water adopts a countercurrent pattern inside the reaction chamber (14) of the foam fractionator and exits through the lower section by using two different outlets (11) located opposite to each other to go upwards through the lateral tubes (20) of the foam fractionator, until exiting these tubes (12) towards the chamber of the bioclarifier tank (6). When exiting the foam fractionator, the water comes into contact with the Kaldnes 1 media where the bacteria fixed in this substrate are carrying out the nitrification.

The water exits the chamber of the bioclarifier tank (6) through the outlet orifice (15) in its upper section and traveling through the upper communicating tube (7) enters the conditioning and maturation tank (1) through the upper section of its lateral side (16) where is connected to the return tube (18) through the inner "T" (17) flowing into the conditioning and maturation tank (1).

The foam fractionator previously mentioned, is located in the inner center of the bioclarifier tank. The water coming from the conditioning and maturation tank (1) through the lower communicating tube (19) goes into the bioclarifier tank through the inlet orifice (9) and ascends through the ascending tube (21) into the reaction chamber (14) of the foam fractionator.

The foam collector is located (13) on the upper end of the reaction chamber (14) of the foam fractionator, containing the dissolved solids separated by flotation to be arranged or withdrawn.

The bioclarifier tank can be drained from the lower side, through the reducer bushing (16) where the solids that settle are concentrated, and through the drain valve (28) in the lower side they are eliminated as required by the water quality management.

All the aforesaid tubes and "T" connectors in this system have 90° elbows to carry out the necessary connections among the sections of each tube.

Measuring and control devices for water temperature, salinity, light, bacteriological control, airlift, UV light, turbidimeter, dosing pumps, and photoreactors are external to the system and are not found in the figures.

Sensors of the temperature and pH control devices are placed, one, in the inner upper section of the conditioning and maturation tank (1), and the other, in the inner upper section of the bioclarifier tank (6). The light is placed on the inner upper section of the conditioning and maturation tank (1). The UV lamp is placed inside the communicating tube (19), while the turbidimeter is located in the upper section of the conditioning and maturation tank (1). These devices are necessary to have a strict control over the growth and health of the molluscs.

Through the system of the present invention the complete conditioning and maturation process of bivalve molluscs takes around 8 to 12 weeks, time after which the molluscs are fit to be transferred to the reproduction system.

The invention claimed is:
1. A recirculating aquaculture system for the conditioning and maturation of bivalve molluscs, the system comprising:
a conditioning and maturation tank including a top end, an interior cavity, a bottom end, and an outlet pipe located at the bottom end;
a bioclarifier tank connected to the conditioning and maturation tank, the bioclarifier tank including a top end, an interior cavity forming a chamber, and a bottom end;
a foam fractionator device located inside the bioclarifier tank, the foam fractionator having a first outlet and a second outlet located at a lower end of the reaction chamber, the first outlet is located opposite from the second outlet;
a reaction chamber located inside the foam fractionator device,
a foam collector located on an upper end of the reaction chamber of the foam fractionator;
a reducer bushing located on the underside of the bioclarifier tank;
a first return tube having a first end connected to the outlet pipe of the conditioning and maturation tank;
a first elbow is connected to a second end of the first return tube;
a second elbow has a first end connected to the first outlet of the foam fractionator;
a third elbow has a first end connected to the second outlet of the foam fractionator;
a first vertical tube connected to the second end of the second elbow;
a lower T device having a first end connected to the first elbow;
a first inlet air pipe vertically connected to a lower end of the first elbow;
a second air inlet pipe vertically connected to a lower end of the second elbow;
a third air inlet pipe vertically connected to a lower end of the third elbow;
a fourth inlet air pipe connected to an inlet pipe of the bioclarifier tank;
a second return tube having a first end vertically connected to a second end of the lower T device;
a lower communication tube having a first end connected to a third end of the lower T device and a second end connected to the inlet pipe of the bioclarifier tank, the lower communication tube connects into a fifth elbow, extends vertically inside the bioclarifier tank, connects to a sixth elbow, then into an inlet pipe at an upper end of the foam fractionator device;

an upper T device having a first end connected to a second end of the return tube, a second end entering the top end of the conditioning and maturation tank, and an open upper end;

an upper communication tube having a first end connected to an upper side of the conditioning and maturation tank and a second end connected to an upper side of the bioclarifier tank;

an airlift device including connections attached to the first, second, third, and fourth air inlet pipes; and wherein the water adopts a countercurrent pattern inside the reaction chamber and exits through the first and second outlets of the reaction chamber and then moves upwards through the first and the second vertical tubes of the foam fractionator, until exiting towards the chamber of the bioclarifier tank;

wherein the bottom end of the conditioning and maturation tank is adapted to receive the bivalve molluscs for their conditioning and maturation as brood stock.

2. The recirculating aquaculture system according to claim 1, wherein the system contains fresh or salt water according to the type of molluscs set for conditioning and maturation.

3. The recirculating aquaculture system according to claim 1, wherein through the lower communicating tube, a portion of the water travels to the bioclarifier tank, while the other portion of the water returns directly to the conditioning and maturation tank through the return tube.

4. The recirculating aquaculture system according to claim 1, wherein the open end of the upper T device is adapted to receive food for the bivalve molluscs and makeup water.

5. The recirculating aquaculture system according to claim 1, wherein the foam fractionator contains a Kaldnes media or K1; the media provides a substrate for a nitrifying bacteria to be colonized by secretion of a mucopolysaccharide, and carry out consumption of nitrogen compounds from the conditioning and maturation tank.

6. The recirculating aquaculture system according to claim 1, wherein the water coming from the conditioning and maturation tank through the lower communicating tube enters the bioclarifier tank through the inlet orifice and is discharged in the upper end of the reaction chamber of the foam fractionator.

7. The recirculating aquaculture system according to claim 1, wherein the water exits the chamber of the bioclarifier tank through the outlet orifice on the upper end and passes through the upper communicating tube until entering the conditioning and maturation tank.

8. The recirculating aquaculture system according to claim 1, wherein the foam collector contains dissolved solids separated by flotation to be arranged or withdrawn.

9. The recirculating aquaculture system according to claim 1, wherein the bioclarifier tank is drained from the lower end, through the reducer bushing where the solids that settle are concentrated, and through a drain valve in the lower end where the solids are eliminated.

* * * * *